United States Patent [19]

Yamamoto et al.

[11] Patent Number: 5,734,417
[45] Date of Patent: Mar. 31, 1998

[54] VISUAL PRESENTATION EQUIPMENT

[75] Inventors: Nobuyuki Yamamoto; Shigetoshi Itoh; Nozomi Nagayama; Kimihiro Nishi; Yoichi Kikukawa, all of Tokyo, Japan

[73] Assignee: Yokogawa Precision Corporation, Shimoina, Japan

[21] Appl. No.: 757,371

[22] Filed: Nov. 27, 1996

[30] Foreign Application Priority Data

| Dec. 5, 1995 | [JP] | Japan | 7-316702 |
| Mar. 21, 1996 | [JP] | Japan | 8-064288 |
| May 27, 1996 | [JP] | Japan | 8-132027 |

[51] Int. Cl.⁶ .................................................. H04N 7/18
[52] U.S. Cl. ........................ 348/61; 348/373; 348/376
[58] Field of Search .......................... 348/61, 373, 376; 358/475, 479; H04N 7/18

[56] References Cited

U.S. PATENT DOCUMENTS

| 4,442,459 | 4/1984 | Fukui | 358/476 |
| 4,623,937 | 11/1986 | Watanabe | 358/483 |
| 4,916,550 | 4/1990 | Miyake | 348/373 |
| 4,939,580 | 7/1990 | Ishikawa | 348/373 |
| 4,963,986 | 10/1990 | Fukuyama | 348/373 |
| 5,247,330 | 9/1993 | Ohyama | 348/373 |
| 5,444,486 | 8/1995 | Mizumo | 348/376 |
| 5,594,502 | 1/1997 | Bito | 348/373 |

*Primary Examiner*—Howard W. Britton
*Attorney, Agent, or Firm*—Moonray Kojima

[57] ABSTRACT

A visual presentation apparatus which applies an illuminating light to an object placed on a stand, obtains an image of the illuminated object using a pick-up camera, transmits the image to a display whereat the image is displayed; wherein the front, back, left and right sides of the stand are open by using a flat plate as the stand, and by mounting the light source on an arm which also supports the pick-up camera and placing the arm outside the stand; and wherein the pick-up camera comprises a mechanism rotatable around the horizontal and vertical axes; and wherein sample clocks which are synchronized with color burst signals are generated by the apparatus and frame memories in which the images are stored are switched at the time of the sample clocks.

6 Claims, 18 Drawing Sheets

VISUAL PRESENTATION EQUIPMENT

BACKGROUND OF THE INVENTION

1. Field of Invention

This invention relates to a visual presentation apparatus which obtains an image of an object to be displayed with a pick-up camera and displays the image on a display screen.

2. Description of the Related Art

A visual presentation apparatus is used to display samples or products on a screen. Some example of conventional visual presentation equipment and problems encountered thereby are discussed below.

FIG. 1 shows an example of a conventional visual presentation equipment, wherein an object 1 to be displayed and having a three-dimensional shape is placed on an object stand 2 with external illuminators 3,4 irradiating the front and back of the object 1. The light is directed to the back and front of the object 1 in order to eliminate shadows created by the object. An image pick-up camera 5 obtains an image of the object 1 as the light source 3,4 illuminates the object. A display 6 shows an image of the object 1 on a screen provided therein by receiving video signals from the camera. The camera 5 may be, for example, a charge coupled device (CCD) camera.

An operator faces the equipment in the direction "A" when carrying out a presentation. Since wall 7 is formed on one side of stand 2, a problem arises in that movement of object 1 is restricted by wall 7 when it is desired to move object 1 forward or backward.

Also, another problem arises in that light sources 3,4 obstruct work to be done on the left or right side of the object 1. (See direction C—C), because the light sources 3,4 are positioned to the left and right of the object 1 to avoid shadows from the object. The work to be done may comprise writing with a marker to the left or right of the object during the presentation.

Another conventional visual presentation equipment is shown in FIGS. 2 and 3 and is provided with a head swinging mechanism which allows the camera to be turned forward, backward, left or right to display, for example, (a) observers of the presentation facing the visual presentation equipment, (b) a blackboard located behind the equipment operator, or (c) objects located to the left or right of the equipment.

FIG. 2 shows a camera head 10 comprising an image pick-up camera, and a knob 11 linked to the camera. By turning knob 11, the camera is turned about an optical axis L. An arm 12 supports camera head 10 to rotate freely about the X-axis. A support means 13 is provided on arm 12 and supports camera head 10 to be freely rotatable about the Y-axis. Support means 13 comprises a hinge.

When camera head 10 is rotated in the direction D around the Y-axis, the camera is turned to face toward X. When camera head 10 is rotated in direction D', the camera is turned to face toward -X. When camera head 10 is rotated about the X-axis in direction E, the camera is turned to face toward Y. When camera head 10 is rotated in direction E', the camera is turned to face toward -Y. Hence, camera 5 may be turned in different directions, such as forward, backward, left, right.

FIG. 3 shows the inside of camera head 10 of FIG. 2, and comprises an image pick-up camera 14. The same parts in FIGS. 1, 2, 3, have the same symbols. The same holds for the remainder of the figures. A hole 101 is provided on the side of camera head 10. A support means 15 supports camera head 10 to be rotatable freely about the X-axis. Support means 15 comprises a shaft 151 inserted into hole 101, and a stopper 152 to prevent shaft 151 from slipping out of hole 101. Camera head 10 is supported by the foregoing components to be freely rotated around the X-axis. A plate member 102 is fixed on the inside of camera head 10 and a hole 103 is provided in plate member 102. The arrangement further comprises a support means 16 for supporting image pick-up camera 14 to be freely rotatable about the optical axis L and comprises a shaft 141 connected to pick-up camera 14 and inserted into hole 103 and a stopper 161 for preventing shaft 141 from slipping out of hole 103. Camera 14 is supported by the foregoing components to be freely rotable about the optical axis L.

The arrangement further comprises knob 11 linked to camera 14, which rotates about axis L by the turning of knob 11. Camera 14 is made to be freely rotatable about optical axis L so as to return the image displayed back to the original position by turning camera. 14 when the image has been rotated by rotating camera head 10.

However, there arises a problem in the conventional devices shown in FIGS. 2 and 3, in that when arm 12 is bent to a dogleg position, such as when the camera 14 is turned toward X or -X, jamming is caused by the wiring contained in the arm 12.

A further example of the conventional equipment is shown in FIGS. 4–6. High resolution, such as comparable to an overhead projector, is required in visual presentation equipment. Such equipment may incorporate frame memories for storing and subsequently displaying a preceding object when one object is replaced with another object. Since a high resolution image requires an extensive amount of data, the image data for one field are usually stored in more than one memory.

FIG. 4 shows an example of a frame memory control system, used in the visual presentation apparatus, and comprises a synchronous separation circuit 20 which generates a horizontal synchronization signal and a field recognition signal from a luminance signal (Y signal) provided by a video camera, not shown, of a visual presentation equipment. A scanning line counter 21 is provided which counts the number of horizontal synchronization signals and outputs a memory switch signal by counting out at a predetermined number. Counter 21 identifies an odd number field and an even number field based on a field recognition signal and outputs a memory switch signal corresponding to the results of the identification. Counter 21 starts counting at the time of the field recognition signal changing points.

A clock generator 22 is provided comprising a Phase Locked Loop (PLL) circuit and which generates sample clock signals which are synchronized with a color burst signal, and whose frequency is higher than the color burst signal, taking the color burst signal contained in color signals (i.e. C signals) sent from the camera, as a reference.

Also shown in FIG. 4 are memories 231 to 233 and 241 to 243. Since the quantity of image data for one field is greater than the memory capacity, data forming images for one field are stored in more than one memory. When forming images for one field, the memories are switched in order to read the complete image data. Memories 231 to 233 and 241 to 243 are, for example, operated in a first in, first out (i.e. FIFO) manner.

The arrangement further comprises A/D converters 25, 26, each carrying out A/D conversion of the Y and C signals, respectively, and a control signal generating means 27 which (a) receives the memory switching signal, and (b) generates (i) an output enable signal, (ii) a write signal, and (iii) a reset signal, necessary for memory control. The generating means 27 (a) selects each data reading memory from the memories 231 to 233 and 241 to 243; (b) permits and inhibits writing in memories 231 to 233 and 241 to 243 with a write signal, and (c) clears the contents of memories 231 to 233 and 241 to 243 with a reset signal. Since memories 231 to 233 and 241 to 243 are used in a FIFO manner, and the data are continuously stored, a reset signal is used when the memory contents need to be renewed and the data need to be newly written therein.

Generating means 27 outputs the data written in memories 231 to 233 and 241 to 243 when a freeze mode is specified and does not write during such mode. This holds the displayed image. When a through mode is specified by a mode switch signal, generating means 27 writes data into memories 231 to 233 and 241 to 243 in turn and immediately outputs the written data. The freeze mode and through mode are, for example, specified with a switch. The write signal level is changed to be high or low corresponding to the freeze mode or through mode.

Connected to the memories are D/A (digital to analog) converters 28, 29 which subject the image data from memories 231 to 233 and 241 to 243 to digital to analog conversion. A display control means 30 provides signals for displaying an image in display means 31 based on the signals received from the converters 28 and 29.

Clock generator 22 supplies sample clock signals to the memories 231 to 233 and 241 to 243; A/D (analog to digital) converters 25 and 26; control signal generating means 27.; and D/A converters 28 and 29. Note that the drawings may not show any direct connection between the clock generator and the using circuit, but, it is to be understood that the clock signals are directed thereto directly or indirectly through other circuits.

FIGS. 5(a) and 5(b) show time charts for image signals outputted by the image pick-up camera, wherein H1 and H2 indicate horizontal synchronization signals; C1 and C2 indicate color burst signals; V1 and V2 indicate video signals; and P indicates a memory switching point. If the phase of color burst signal C2 is shifted from that of color burst signal C1, the phase shifts between the display line of video signal V1 and the display line of video signal V2 thereby resulting in the generation of color shading in the displayed image. FIG. 5(a) shows signals having no phase shift while FIG. 5(b) shows signals having a phase shift. In FIG. 5(b), a time shift of Dt is caused after switching of the memories.

In the arrangement of FIG. 4, since the memories are switched based on the number of analog horizontal synchronization signals, the phase of the horizontal synchronization signals maybe shifted near the memory switching point due to aging or temperature change. This may generate undesired color shading in the displayed image.

FIG. 6(a) and 6(b) show examples of a displayed image when a phase shift is generated in the color burst signals. As shown in FIG. 6(a) line L1 in field #1 and line L3 in field #2 are the switching points for the memories. The image for field ∩1 is formed with the image data from memories 231 and 232, and the image for field #2 is formed with the image data from memories 232 and 233. If the phase of the analog horizontal synchronizing signal is shifted due to temperature change or aging near the memory switching point, undesired color shading portions A1 and A2 occur in the image, as shown in FIG. 6(b).

Thus, a problem arises in that undesired color shading may occur in the displayed image due to shifting of phase resulting from aging or temperature changes. This problem arises because the memory switching time is based on an analog horizontal synchronizing signal.

SUMMARY OF THE INVENTION

Accordingly, an object of the invention is to overcome the aforementioned problem, disadvantages and deficiencies of the prior art.

Another object is to provide a visual presentation apparatus wherein ease of use by an operator is enhanced; wherein jamming of wiring is eliminated regardless of which direction the image pick-up camera is turned; and wherein color shading due to aging and/or temperatures changes is substantially eliminated.

DETAILED DESCRIPTION OF THE PREFERRED EMBODIMENTS

First Embodiment—Visual Presentation Apparatus

Figure 1:
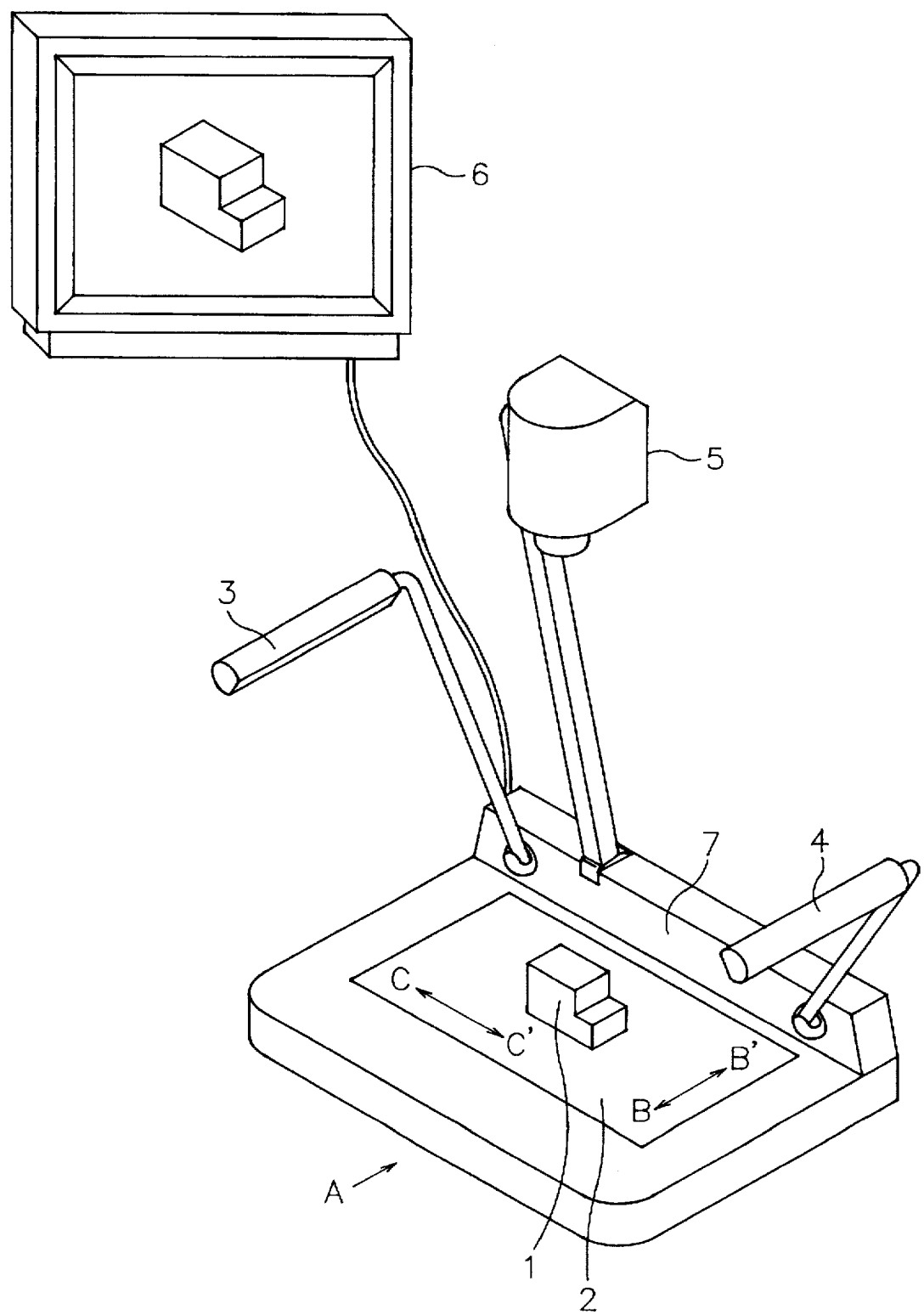
FIG. 1 is a perspective view depicting an exemplary conventional visual presentation apparatus.
Figure 2:
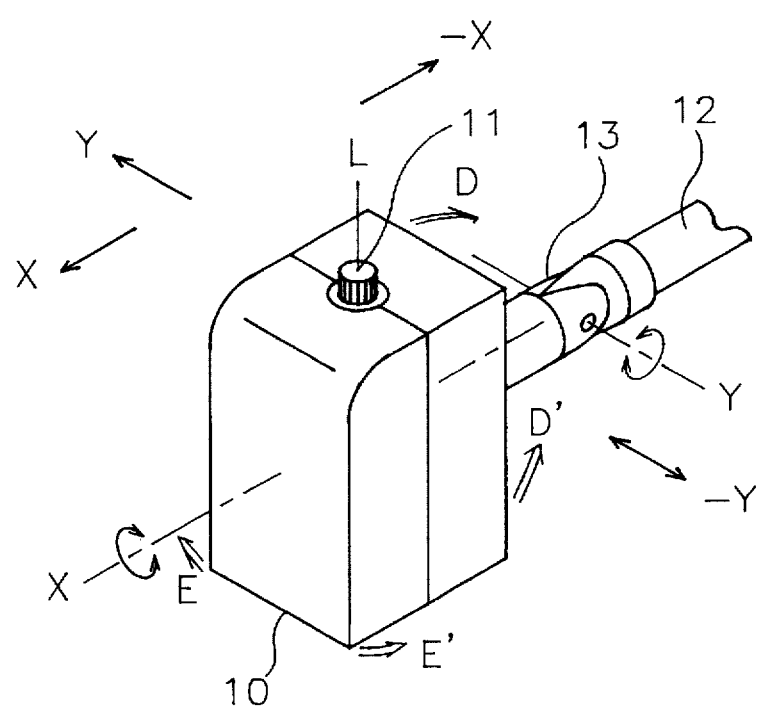
FIG. 2 is a perspective view depicting an example of a head support mechanism used in the apparatus of FIG. 1.
Figure 3:
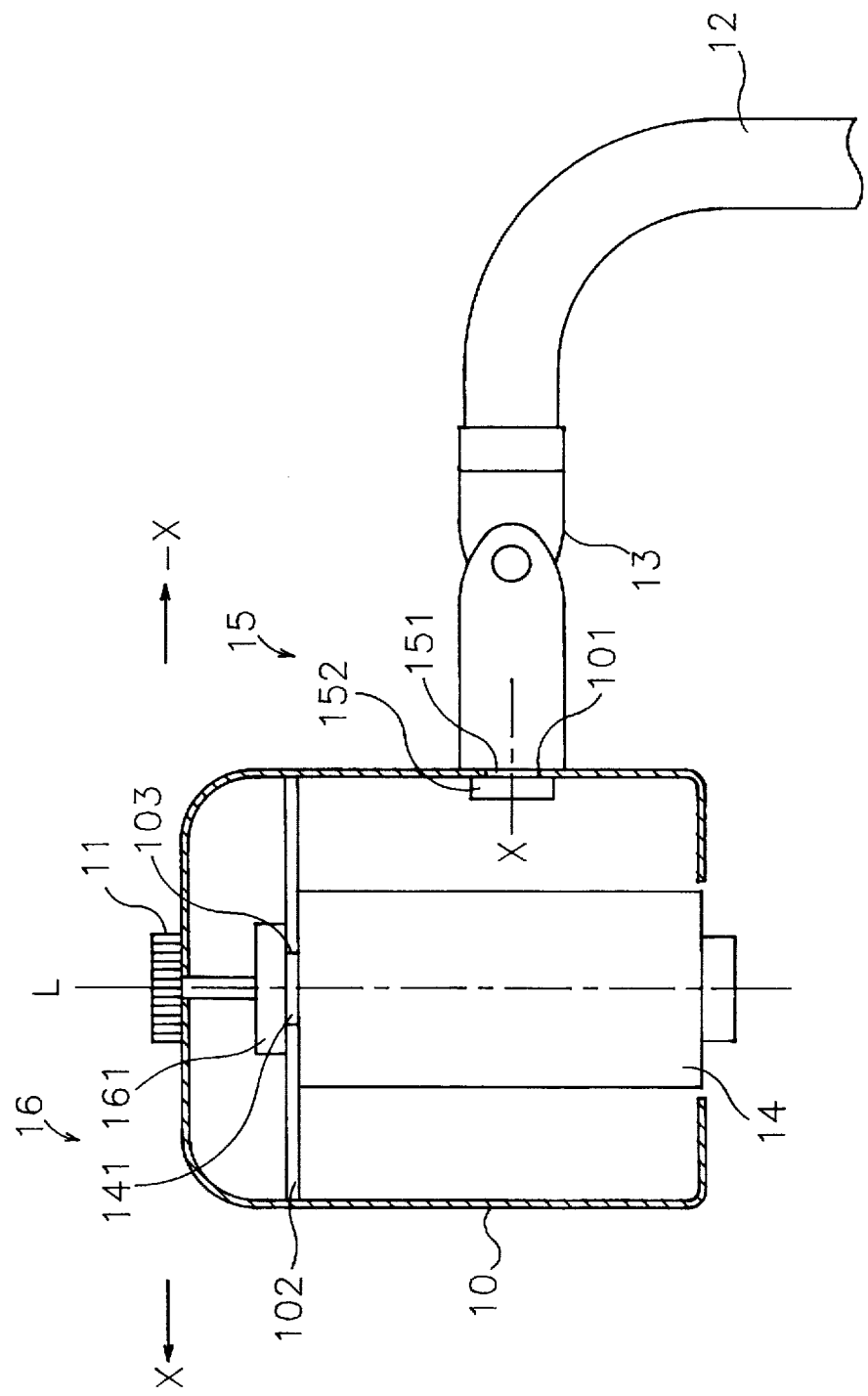
FIG. 3 is a side view depicting the inside of the head support mechanism of FIG. 2.
Figure 4:
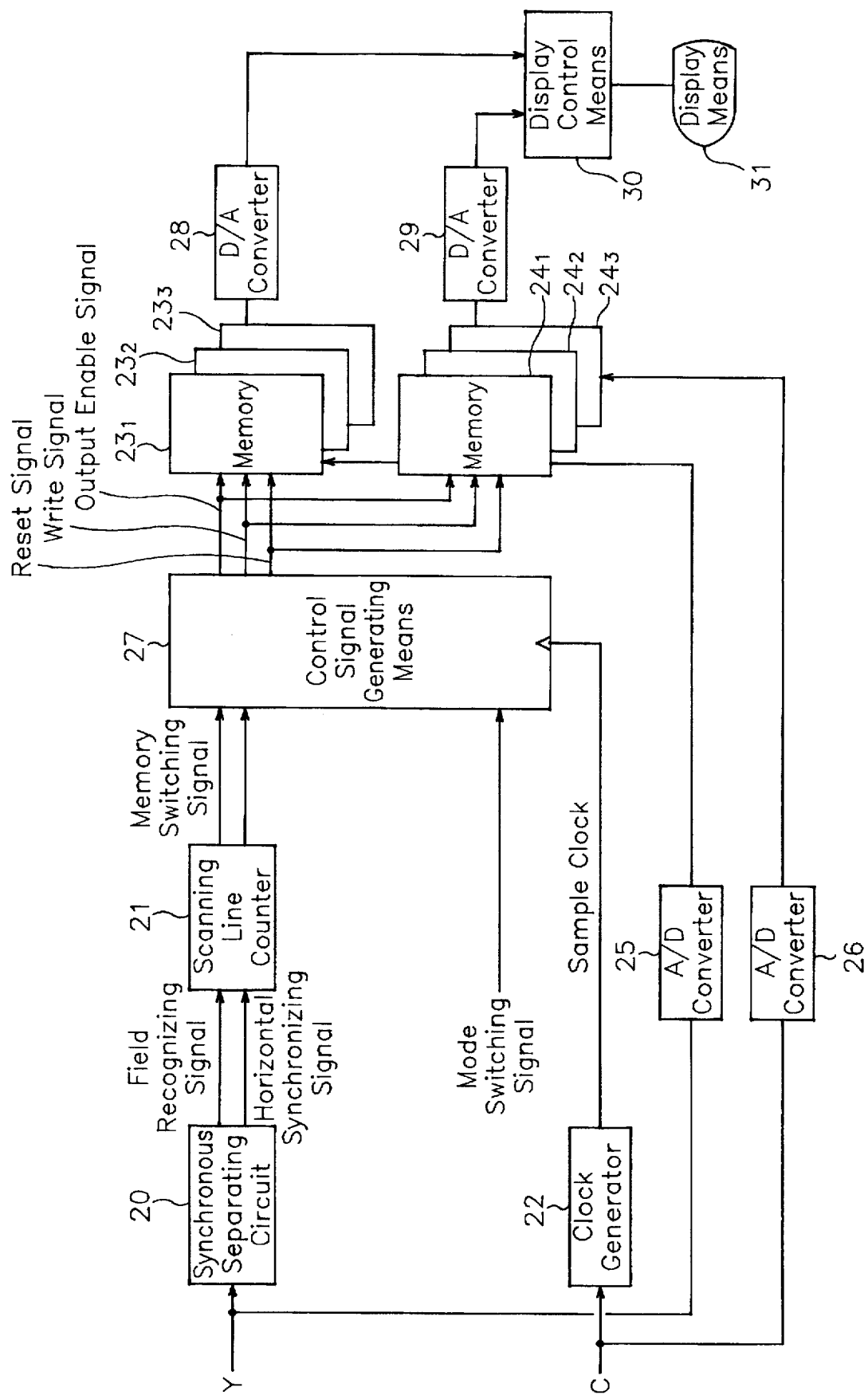
FIG. 4 is a block diagram depicting an example of a conventional frame memory control system used in the apparatus of FIG. 1.
Figure 5:
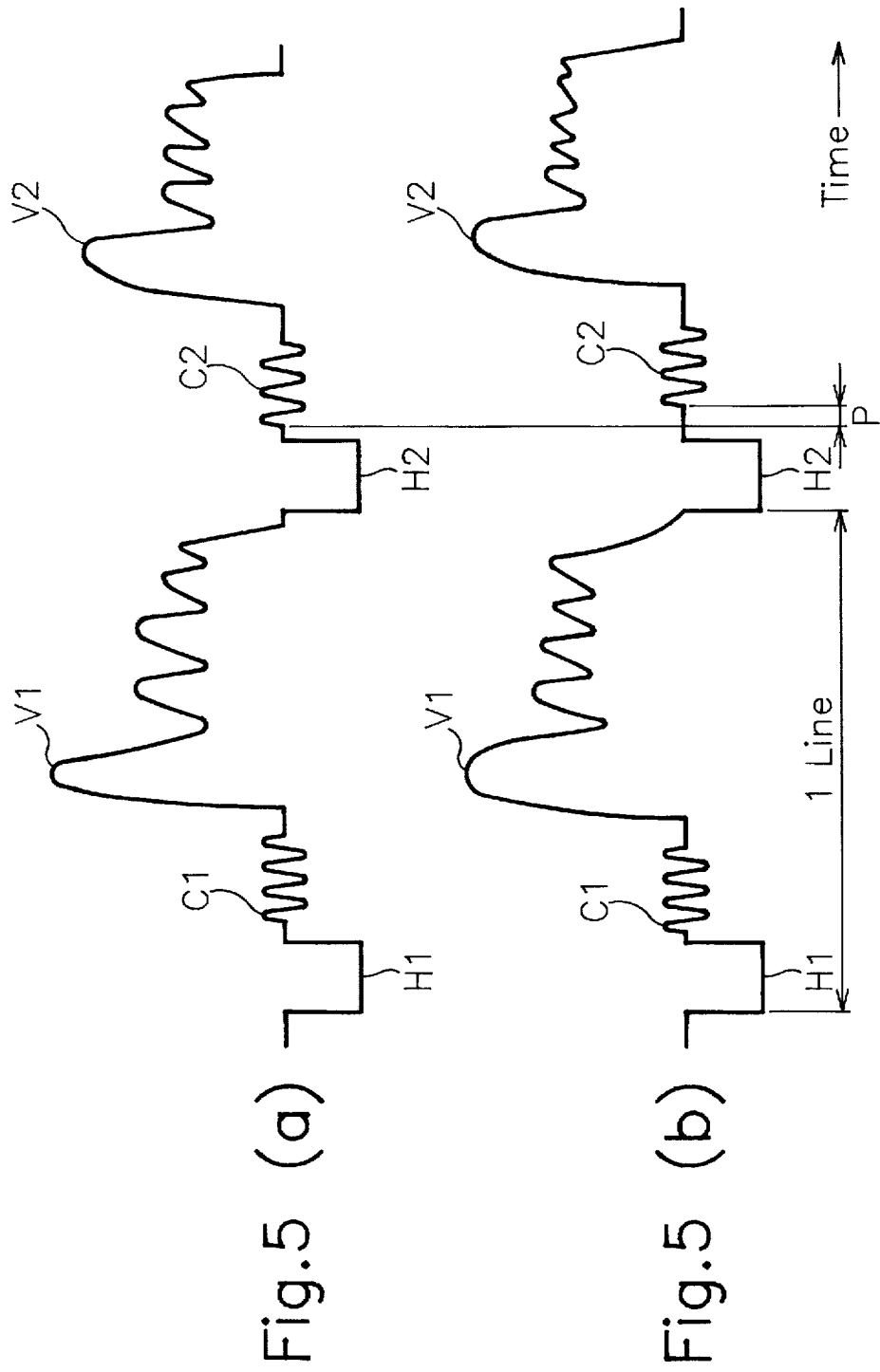
FIGS. 5(a) and 5(b) are time charts depicting image signals produced by the pick-up camera.
Figure 6:
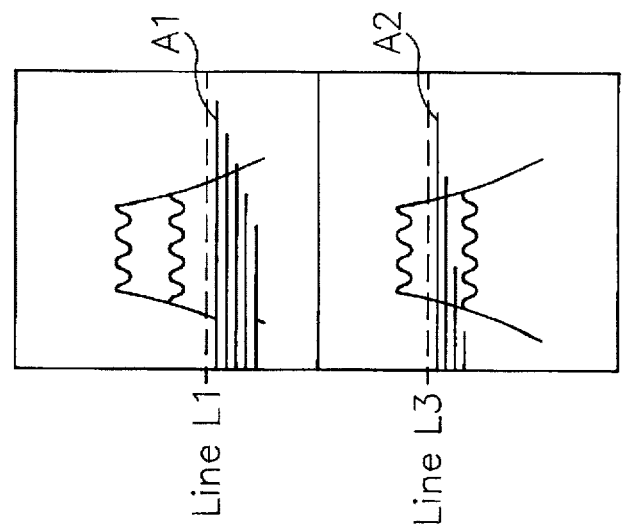
FIGS. 6(a) and 6(b) are diagrams depicting images displayed when a phase shift occurs in the color burst signals.
Figure 6:
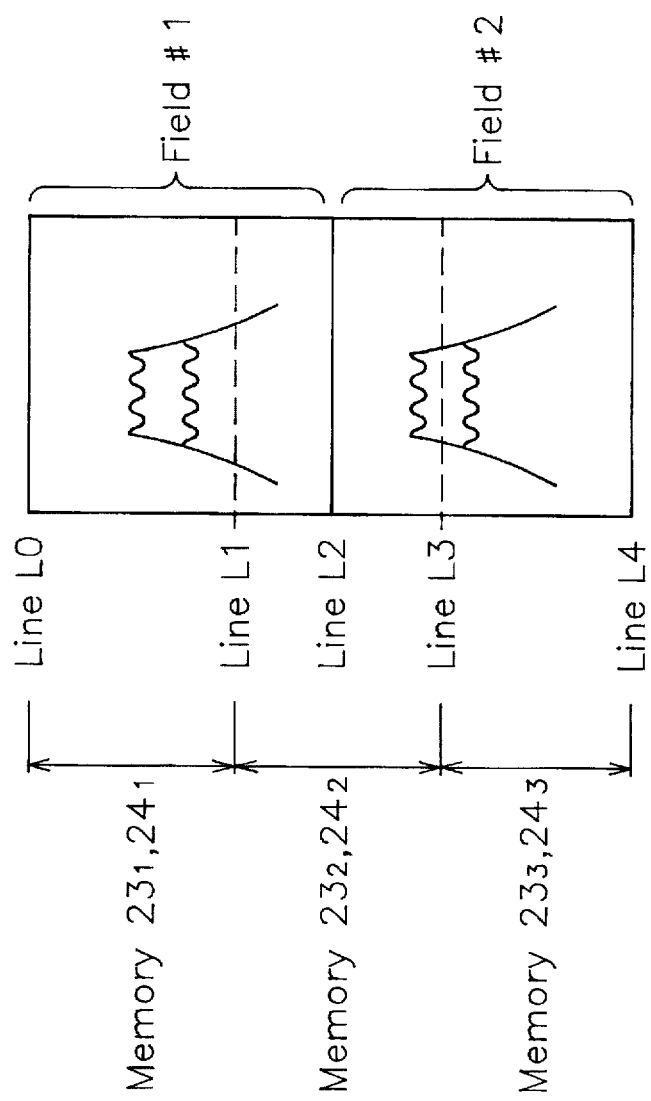
Figure 7:
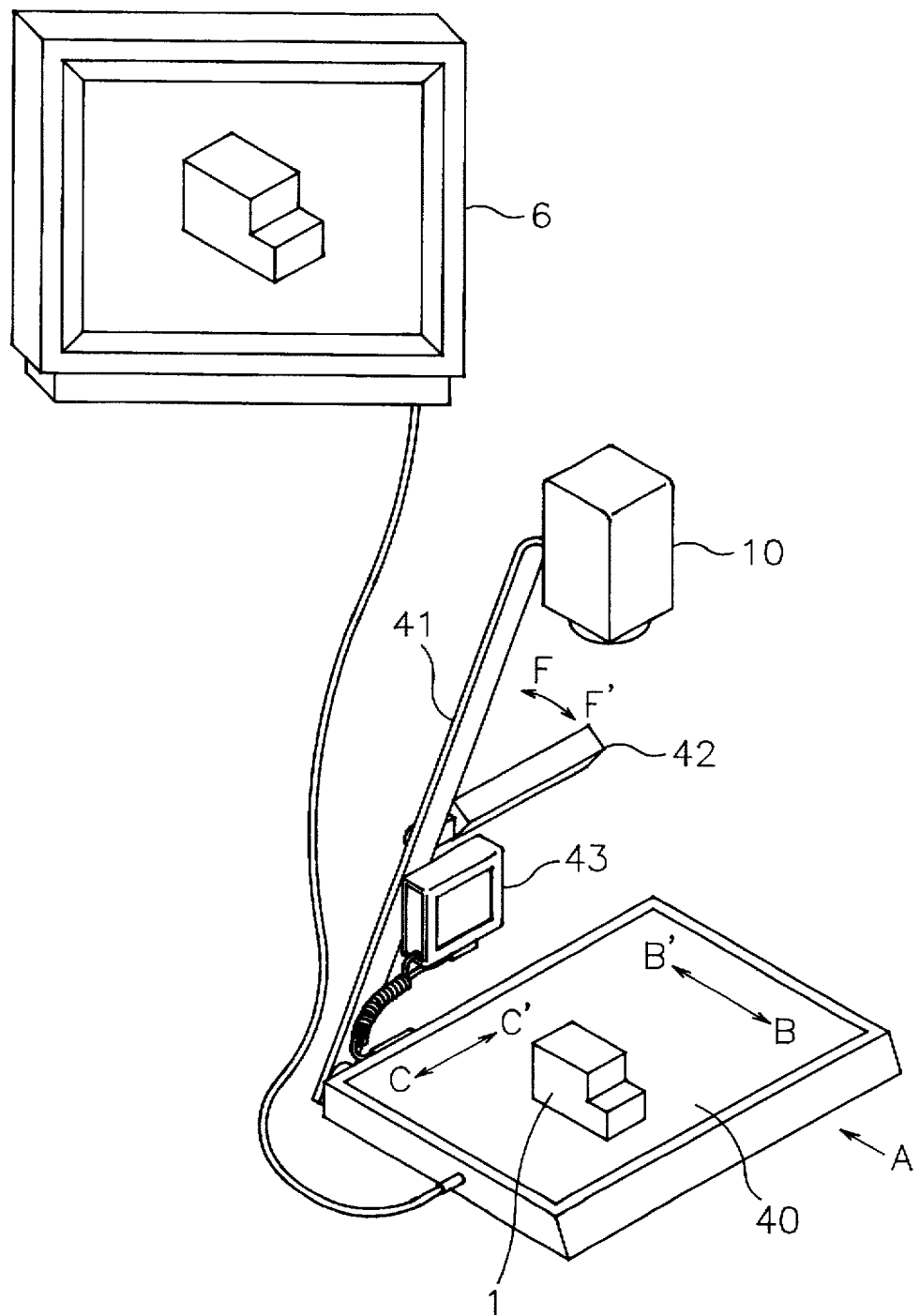
FIG. 7 is a perspective view depicting an illustrative first embodiment of the invention.

FIG. 7 shows an object stand 40 formed in the shape of a substantially flat plate; an arm 41 having one end thereof supporting camera head 10 and another end thereof attached to a corner of stand 40; and an external light source 42 having a length dimension extending approximately to the left and right ends of the stand 40. Hence, the light source 42 irradiates object 1 from both sides and no shadows are produced by the object, which has three dimensions. The light source 42 is also mounted on arm 41 and is rotatable in direction F—F'. When source 42 is rotated in direction F, source 42 can be housed in arm 41 with its longitudinal direction coinciding with the longitudinal direction of arm 41. When source 42 is not required at a sufficiently bright place where the apparatus is used, the source may be housed in arm 41.

A monitor display 43 is mounted on arm 41 and comprises a screen which faces in direction A, when the operator is facing the apparatus. Thus, the operator can simultaneously see in the monitor 43 that which is being displayed in display 6.

The camera head 10, including the camera, obtains an image of object 1, which is illuminated by source 42, and sends video signals of the image to display 6. Display 6 then displays the image on its screen. At the same time, monitor display 43 also receives the same signals and displays the same image on the screen thereof. In this manner, the operator can monitor the presentation in an easy manner.

Since stand 40 is formed as a substantially flat plate and hence no obstruction exists in the forward or backward direction, i.e. B—B' direction, the movement of object 1 is not restricted and object 1 can be readily moved in such directions. In addition, since source 42 is mounted on arm 41, no obstruction exists in the right or left direction and object 1 can be readily moved in such right or left direction, and furthermore, various work can be performed readily about the object by the operator without any obstruction interfering with his work. Moreover, when source 42 is housed in or adjacent to arm 41, the area about the stand 40 is free of further obstacles. Thus, the embodiment enhances the ease of use by an operator of the visual presentation apparatus, as compared with the prior art.

Figure 8:
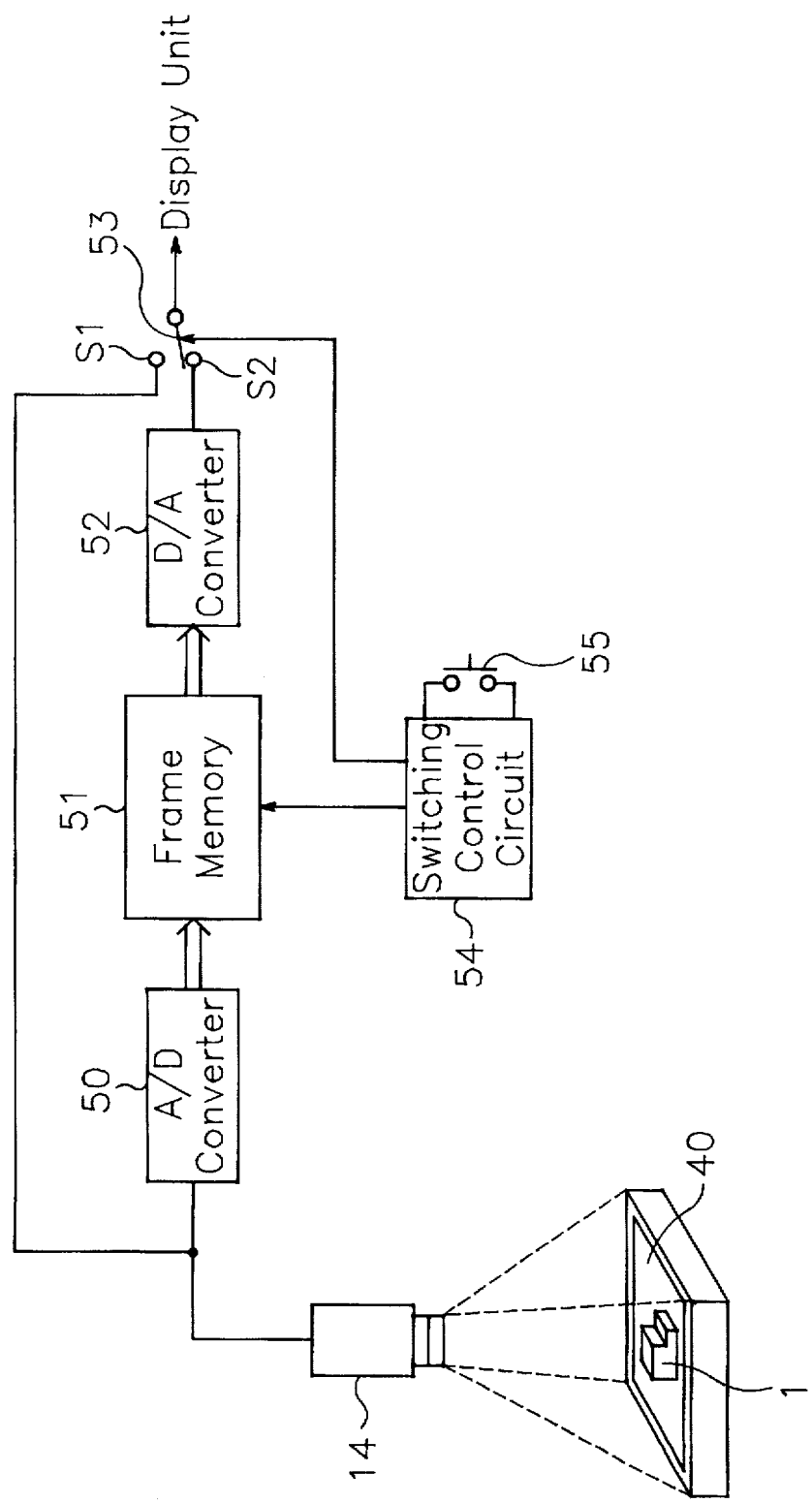
FIG. 8 is a block diagram depicting an example of a display switching circuit for the embodiment of FIG. 7.

FIG. 8 shows details of the display switching circuit of FIG. 7, comprising A/D converter 50 to sample video signals from camera 14, a frame memory 51 for accumulating images taken from camera 14 by storing the video signals therefrom and sampled by A/D converter 50, and D/A converter 52 for converting digital data read from the frame memory 51 into analog data.

A video switch 53 is switched from a connecting status (S1) in which the video signals from camera 14 are directly transmitted to display 6, to a connecting status (S2) in which an image read from the frame memory 51 is transmitted to display 6 and vice versa.

A switching control circuit 54 controls frame memory 51 and video switch 53 corresponding to the switching of memory switch 55. When memory switch 55 is turned ON, control circuit 54 enables image data to be read from frame memory 51 as well as transfer video switch 53 to contact S2. When memory switch 55 is turned OFF, control circuit 54 transfers video switch 53 to contact S1 and transmits video signals from camera 14 directly to display 6. Control circuit 54 also controls the writing into frame memory 51 while memory switch 55 is turned OFF, and at the time an image is being displayed.

Operation of the ON and OFF states of memory switch 55 may also be done in a reverse manner.

Operation of the FIG. 8 circuit is as follows, with objects "a" and "b" being used as examples. A default state exists when memory switch 55 is turned OFF and video switch 53 is transferred to contact S1. This enables an image obtained by camera 14 to be directly indicated in display 6. In this state, the operator puts object "a" on stand 40 and an image of object "a" is shown in display 6. The operator may orally discuss object "a" while showing such object.

When the discussion of object "a" is completed, the operator turns ON memory switch 55. Control circuit 54 reads the image data from frame memory 51 and transfers video switch 53 to contact S2. The operator then replaces object "a" with object "b". During replacement, the image of object "a" is displayed subsequently. For this reason, the condition of stand 40 is not displayed during replacement.

After object "a" is replaced on stand 40 with object "b", the operator turns OFF memory switch 55. This switches the image on display 6 from that of object "a" to object "b". Now, the operator discusses object "b" while showing object "b". When replacing one object with another, the same operation is followed.

Figure 9:
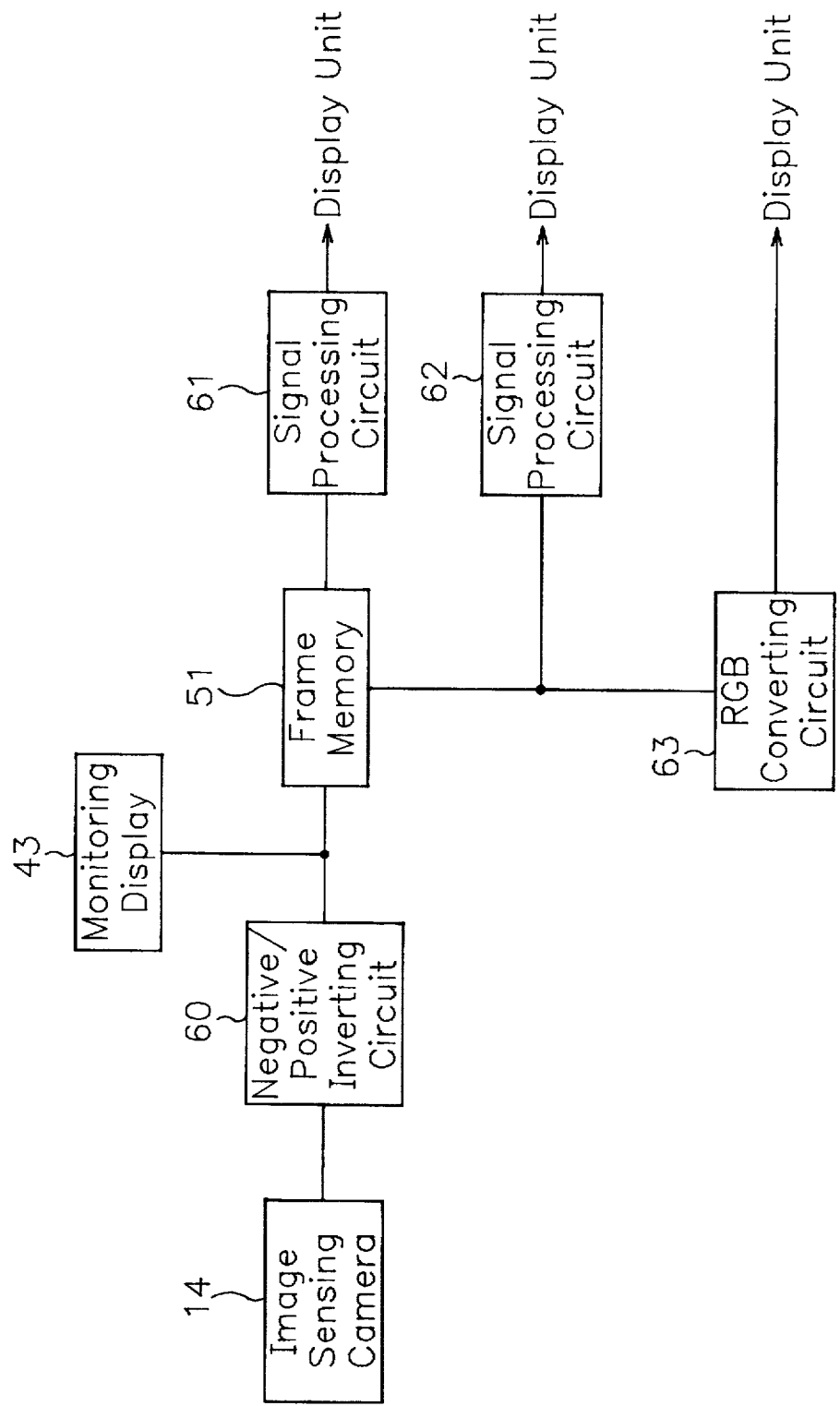
FIG. 9 is a block diagram depicting an example of an image processing circuit for the embodiment of FIG. 7.

FIG. 9 shows the image processing circuit of FIG. 7 comprising a positive/negative inverting circuit 60 which changes an image obtained from camera 14 from positive to negative and vice versa. Signal processing circuit 61 processes image data read from frame memory 51 and transmits the data to display 6. Signal processing circuit 62 processes the image data read from frame memory 51 and transmits the data to display 6. Signal processing circuit 62 gives provides a higher quality signal processing than does circuit 61. In signal processing, a higher image quality is obtained by separating luminance signals from color signals, as compared with the process which mixes luminance signals with color signals. The signal processing circuit 62 carries out the former higher quality type of signal processing whereas the signal processing circuit 61 carries out the latter type of signal processing. Accordingly, depending on the image quality desired of display 6, the image data is connected to signal processing circuit 62 or 61, selectively.

An RGB converting circuit 63 converts the image data read from frame memory 51 to the three primary colors of read (R), green (G) and blue (B). When a visual presentation apparatus displaying an image by applying R,G and B light to the screen is used, display 6 is connected to RGB converter circuit 63.

In the first embodiment of FIG. 7, the stand is flat in shape and the light source (also called "illuminator") is mounted on the arm which also support the camera. This provides an open area about the flat surface, forward, backward, left and right. Thus, the forward or backward movement of the object being displayed on the stand is not limited. Also, the light source does not obstruct any task performed to the right and left of the object disposed on the stand. When the source is housed in or adjacent to the arm, further open areas are provided about the flat surface of the stand.

Accordingly, the first embodiment enhances the ease of use by an operator as compared with the prior art.

Second Embodiment—Visual presentation apparatus

Figure 10:
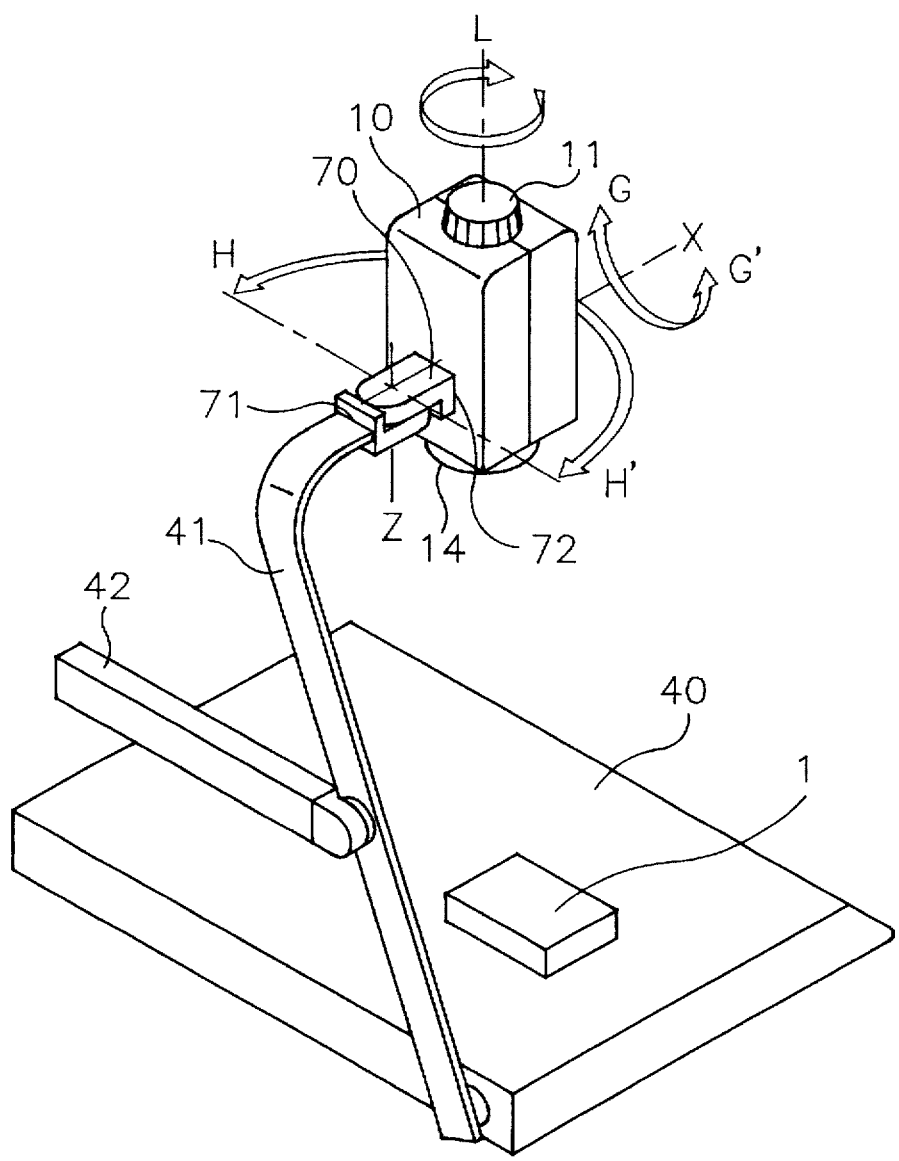
FIG. 10 is a rear perspective view depicting an illustrative second embodiment of the invention.

FIG. 10 shows a second embodiment of the invention comprising a head support member 70 disposed between camera head 10 and arm 41; support means 71 which supports head support member 70 to be freely rotatable about the Z-axis (wherein the Z-direction is vertical) to arm 41; and support means 72 which supports camera head 10 to be freely rotatable about the X-axis to head support member 70. Accordingly, camera head 10 is supported to be freely rotatable about the X-axis (i.e. in the G—G' direction) and Z-axis (i.e. in the H—H' direction). The other components are explained elsewhere in the specification.

Figure 11:
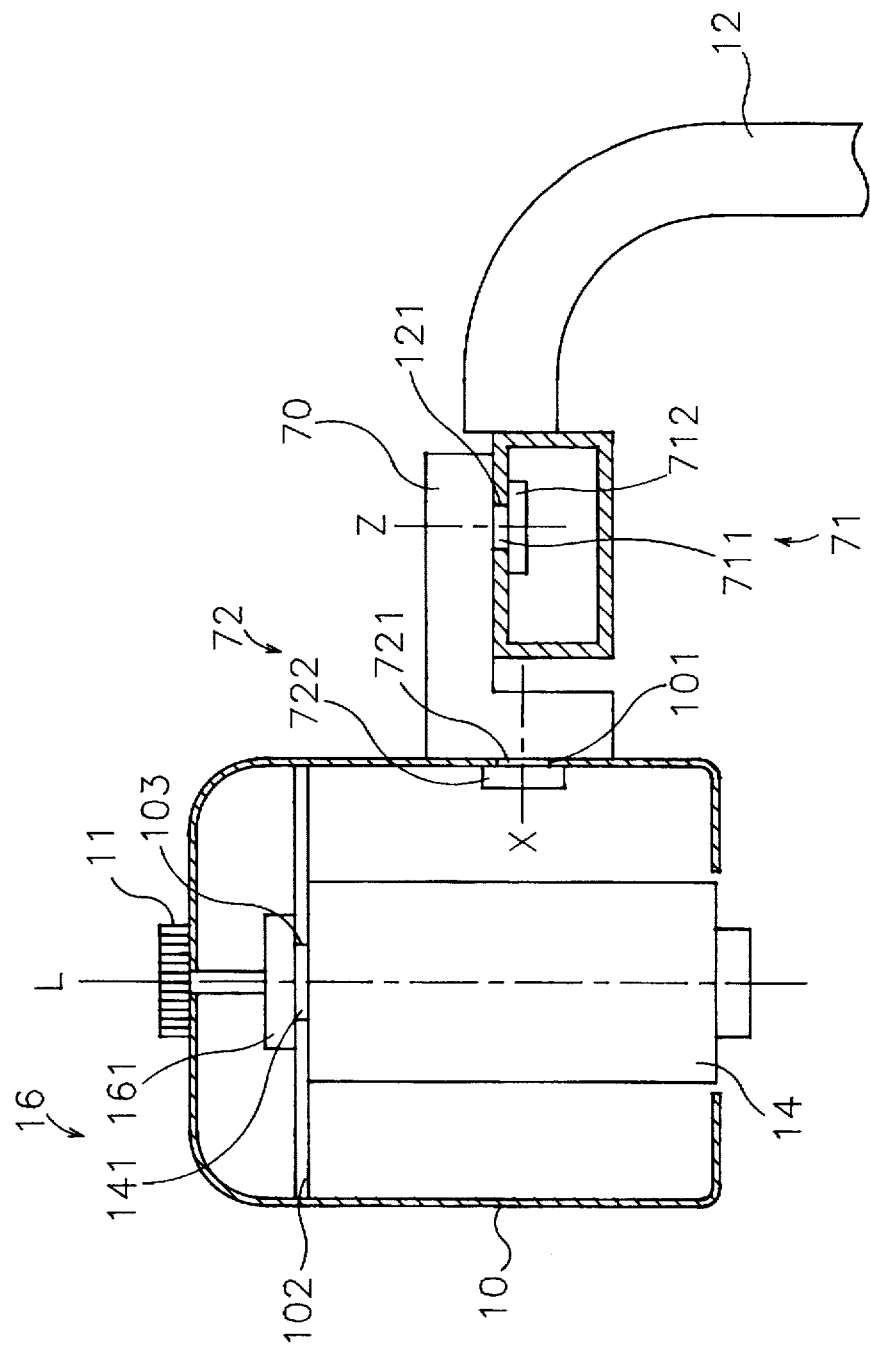
FIG. 11 is a side view depicting a head support mechanism for the embodiment of FIG. 10.

FIG. 11 shows details of the head swinging mechanism, wherein support means 71 comprises a shaft 711 inserted in hole 121 and a stopper 712 to prevent shaft 711 from coming out of hole 121. Shaft 711 is fixed to head support member 70. Support means 72 comprises a shaft 721 inserted into hole 101 and a stopper 722 to pre-vent shaft 721 from slipping out of hole 101. Shaft 721 is fixed to head support member 70. Accordingly, camera head 10 is supported to be freely rotatable about the X-axis and the Z-axis. In addition, support means 16, 71 and/or 72 maybe provided with detent mechanisms.

FIGS. 12(a)–12(e) illustrate the operation of the embodiment of FIG. 10, wherein camera head 10 and head support means 70 are viewed from above the stand 11, for convenience of illustration.

Figure 12:
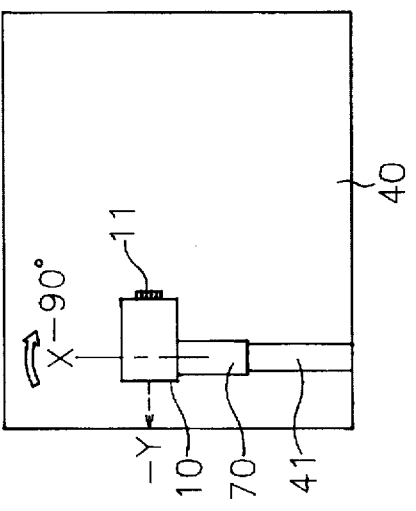
FIGS. 12(a)–12(e) are drawings depicting operation of the embodiment of FIG. 10.
Figure 12:
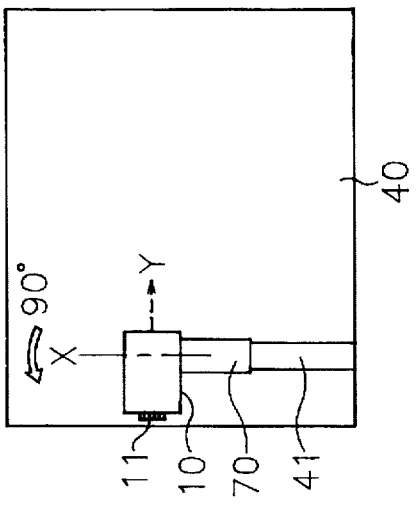
Figure 12:
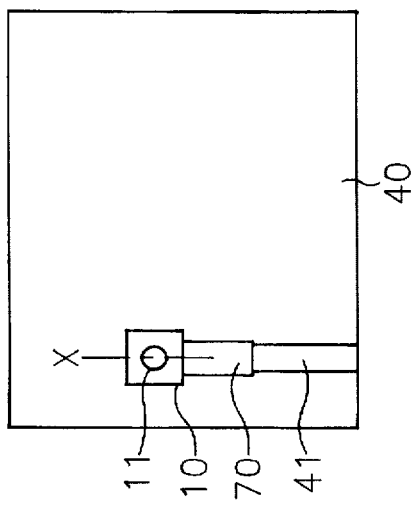
Figure 12:
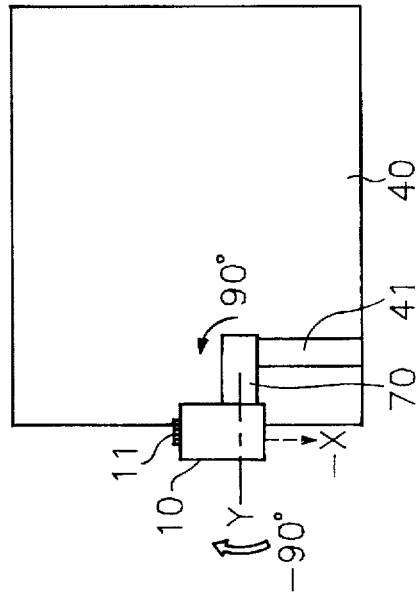
Figure 12:
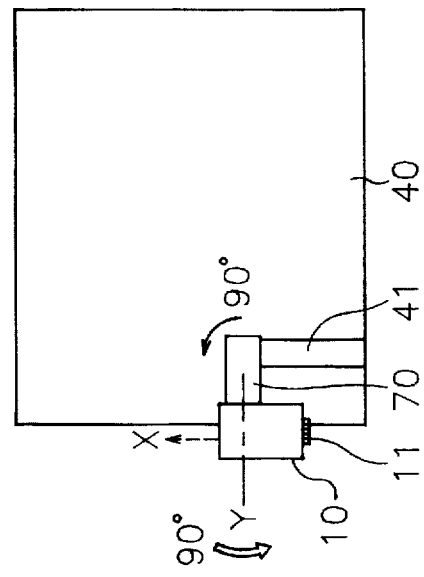

FIG. 12(a) shows the condition wherein camera 14 is oriented vertically downward to view an image of stand 40. FIG. 12(b) and FIG. 12(c) show conditions wherein camera head 10 is rotated about the X-axis either by 90° or by −90°. In these conditions, camera is turned in the direction of Y or -Y, respectively. FIG. 12(d) shows the condition wherein head support member 70 is rotated by 90° about the Z-axis and then camera head 10 is rotated by 90° about the Y-axis from the condition of FIG. 12(a). In this condition, camera 14 is turned in the direction of X. In the condition of FIG. 12(a), because of the head support member 70, camera head 10 is freely rotatable about the X-axis. However, in the condition of FIG. 12(c), since the head support member 70 is rotated by 90° about the Z-axis, camera head 10 become freely rotatable about the Y-axis. FIG. 12(e) shows the condition wherein head support member 70 is rotated by 90° about the Z-axis and then camera head 10 is rotated by −90° about the Y-axis from the condition of FIG. 12(a). In this condition, camera 14 is oriented in the direction of -X.

When an image is rotated because camera head 10 is rotated, camera 14 is rotated by turning knob 11 to restore the image to the original position. Camera 14 can be oriented in the X,-X, Y or -Y direction by causing camera head 10 to be in the positions shown in FIGS. 12(b) to 12(e), respectively.

In the second embodiment, mechanism is provided for rotating the camera about the horizontal and vertical axes. Accordingly, the camera can be oriented in any direction, e.g. forward, backward, leftward or rightward, as desired, by combining the rotations about the horizontal and vertical axes, without bending the arm to be in a "dogleg" shape. This allows the visual presentation apparatus to be free from cluttered wiring regardless of whether the camera is oriented in the backward, forward, rightward or leftward position.

Third Embodiment—Control Circuitry

Figure 13:
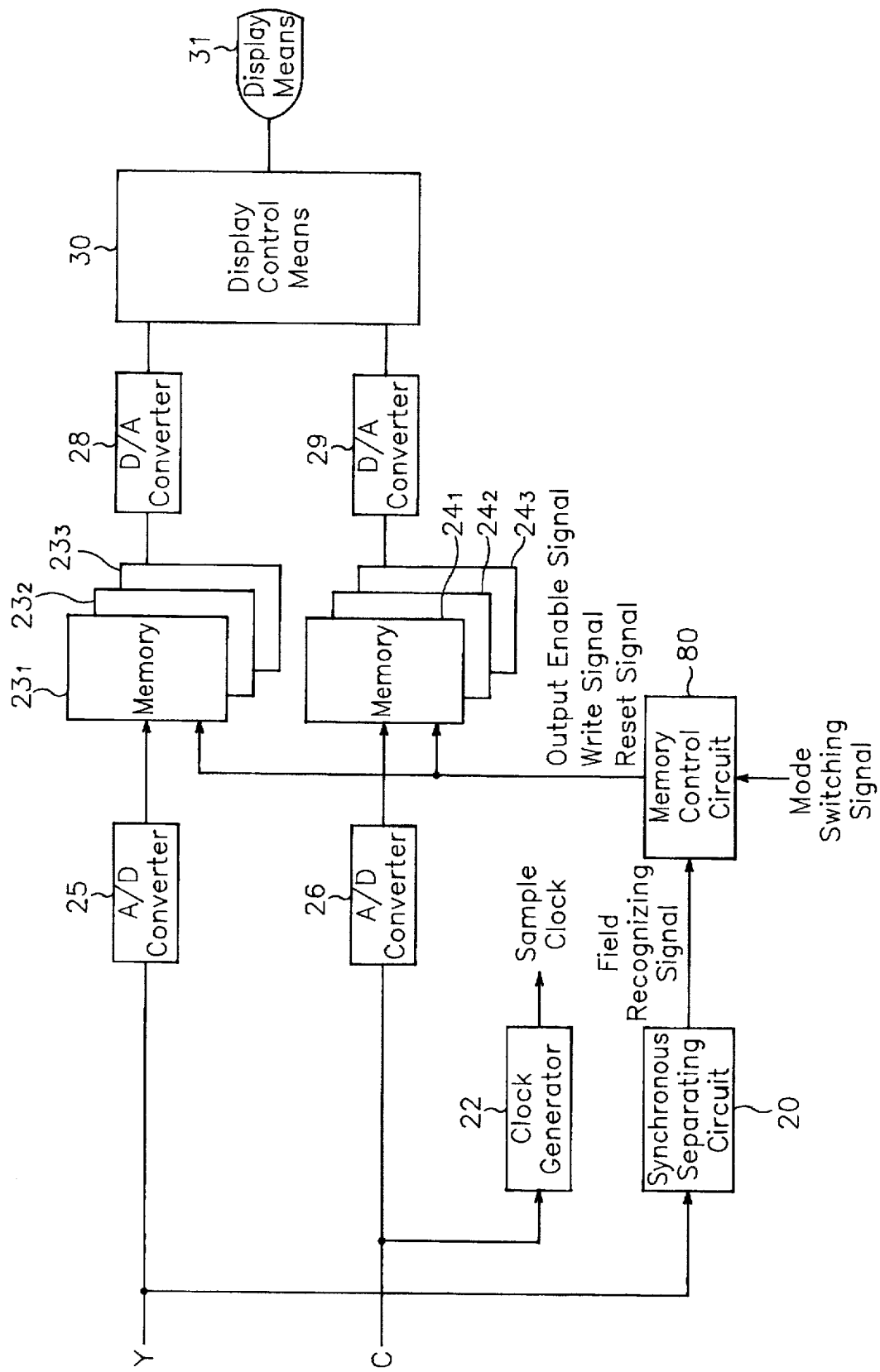
FIG. 13 is a block diagram depicting circuitry of an illustrative third embodiment of the invention.

FIG. 13 shows a memory control circuit 80 which receives a field recognition signal and mode switch signal and provides an output enable signal, a write signal, and a reset signal to memories 231 to 233 and 241 to 243.

Figure 14:
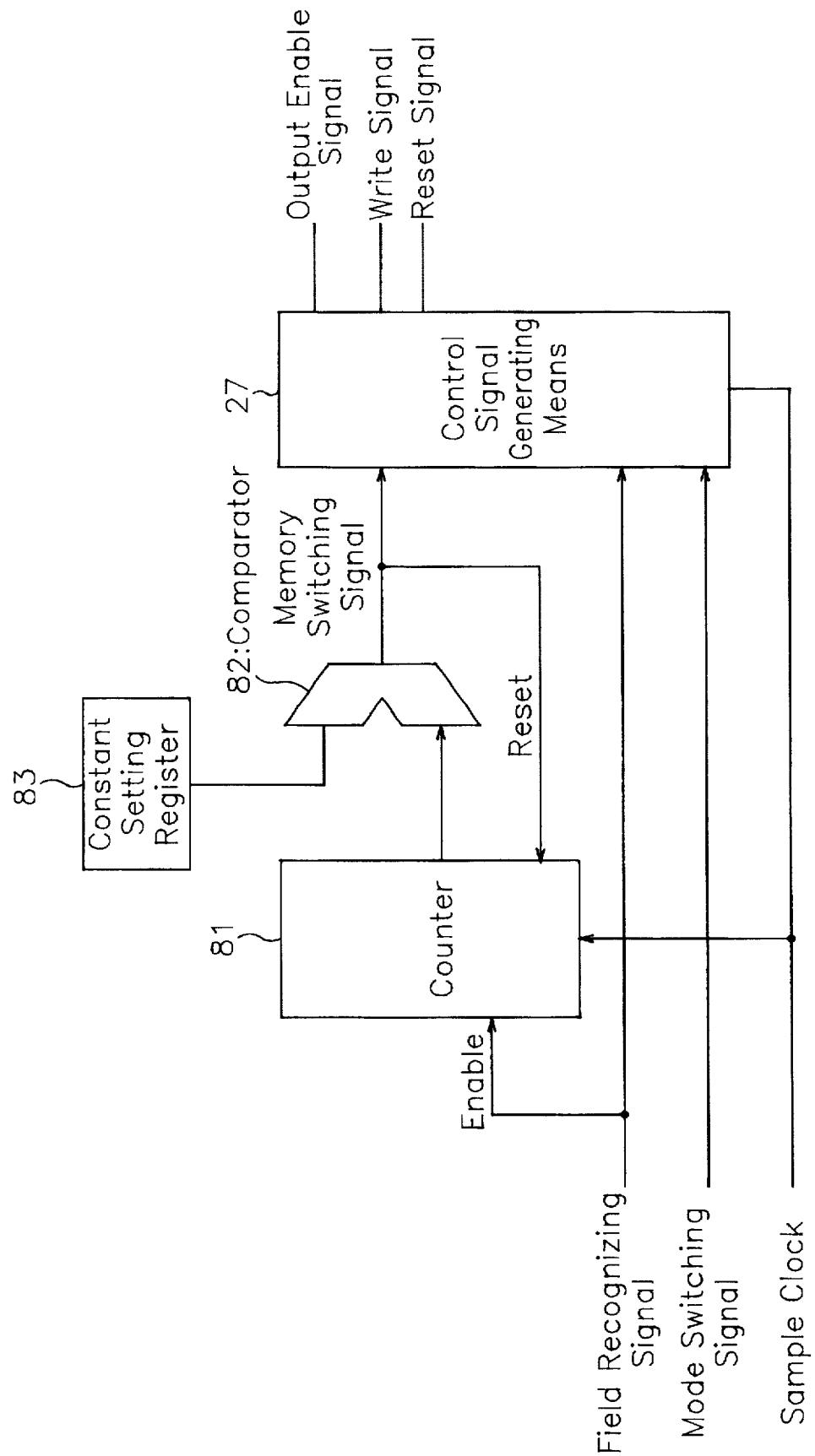
FIG. 14 is a block diagram depicting an example of the memory control circuit of FIG. 13.

FIG. 14 shows details of the memory control circuit 80 comprising a counter 81 which starts counting at the field starting point and counts the number of sample clocks generated by clock generator 22. The field starting point is detected from the changing points in the field recognition signal. Since a pixel is written when one sample clock is provided, counter 81 counts the number of pixels which are written. A comparator 82 compares the number of counts in counter 81 with a reference value set in constant setting register 83, directs the switching of the memories with a memory switching signal when the number of counts in counter 81 reaches the reference value, and at the same time resets the counter 81. Whether the switching point for the memories is reached or not is checked by comparator 82. In addition, the capacity of memories 231 to 233 and 241 to 243 may be of an arbitrary size. The settings of the constant setting register 83 are determined corresponding to the memory capacity.

Operation of the system shown in FIG. 13 is as follows. The Y and C signals, which are transmitted from the camera, are subjected to an A/D conversion in A/D converters 25,26. Clock generator 22, which uses in one example, a PLL circuit, generates sample clock signals having frequencies which are higher than that of the color burst signal and which are synchronized with that signal using the color burst signal included in the C signal as a reference. Synchronous separating circuit 20 generates a field recognition signal at a logic level based on the Y signal.

Memory control circuit 80 starts the counting at the changing point of the field recognition signal, and then counts the number of sample clocks with counter 81, and then switches the memories in which the data are to be written when the number of counts reaches the reference value.

Figure 15:
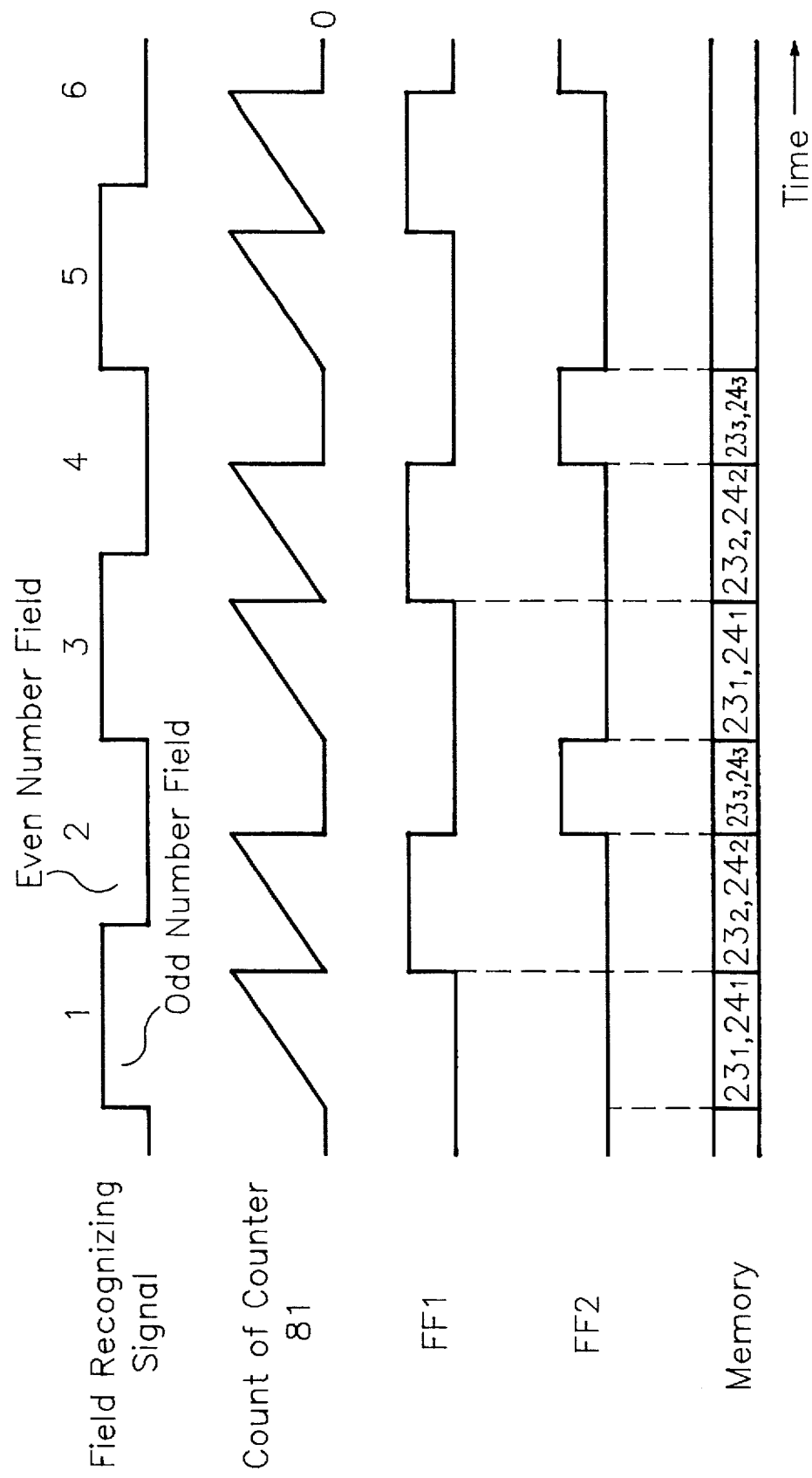
FIG. 15 is a time chart depicting signals in the embodiment of FIG. 13.

FIG. 15 shows the timing of each signal occurring in the visual presentation apparatus of FIG. 13 When an odd field is detected, the field recognition signal become high. When an even field is detected, the field recognition signal becomes low.

When counter 81 counts out the first time, the first flip flop output FF1 becomes high. When the counter 81 counts the second time, the second flip flop output FF2 becomes high. When counter 81 counts out the third time, the outputs of both flip flops FF1, and FF2 become low. Subsequently, the counter repeats the foregoing operation.

When both flip flop outputs FF1 and FF2 are changed, the memories are switched. When both FF1 and FF2 are at the low level memories 231 and 241 are selected. When FF1 is at the high level and FF2 is at the low level, memories 232 and 242 are selected. When FF1 is at the low level, and FF2 is at the high level, memories 233 and 243 are selected. The memories are selected with decode signals which are obtained by decoding the flip flop outputs FF1 and FF2, using a decoder.

Figure 16:
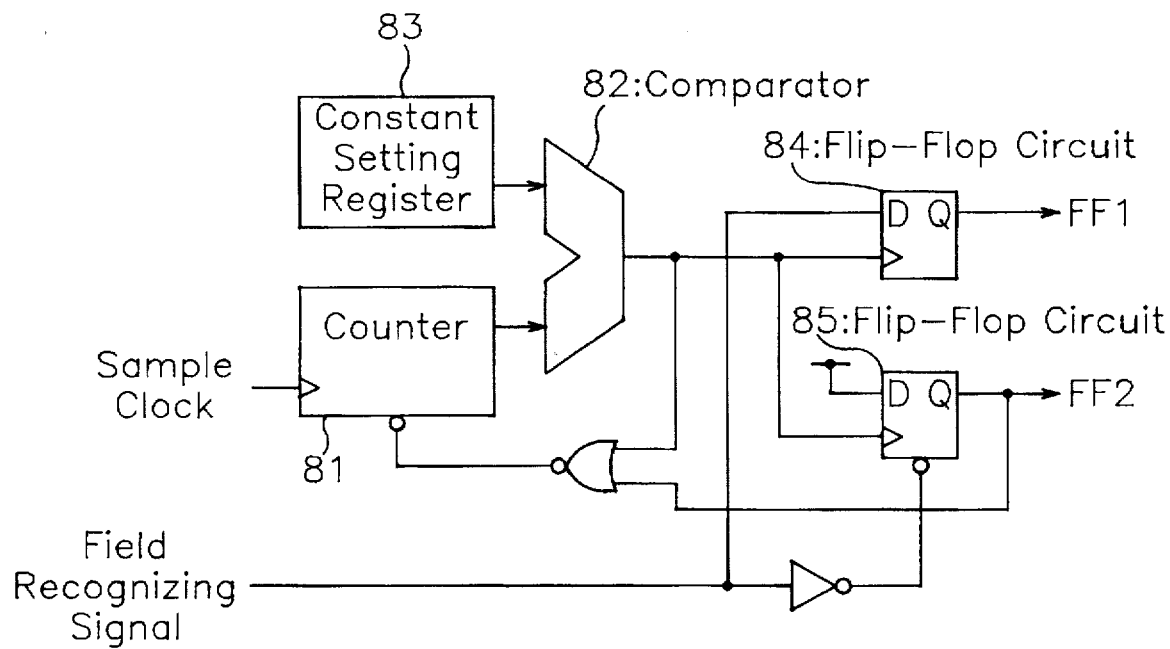
FIG. 16 is a block diagram depicting an example of a counter connected to a flip flop circuit.

FIG. 16 shows the connection of counter 81 to the flip flop circuits, wherein flip flop circuits 84 and 85 provided output signals FF1 and FF2, respectively.

Figure 17:
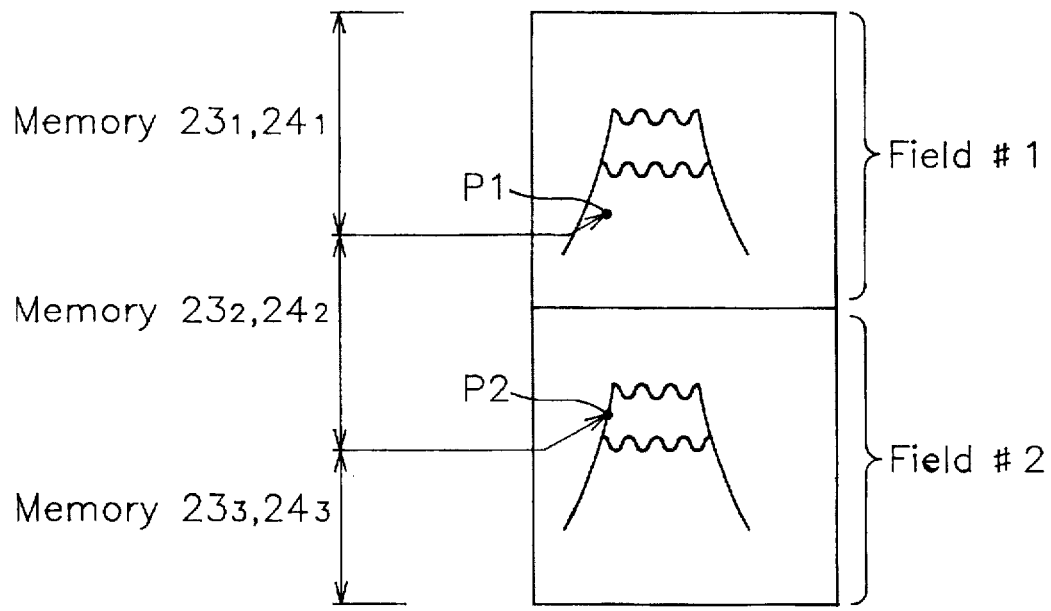
FIG. 17 is a diagram depicting an image display using the embodiment of FIG. 13.

FIG. 17 shows an image displayed when using the embodiment of FIG. 13. In the embodiment of FIG. 13, since the number of image pixels is counted from the starting point of the field and the memories are switched at a point where the number of counts reaches a predetermined value, in principle, there is no discontinuity of the images. In the third embodiment, although the memory switching points are located at points P1 and P2 in FIG. 17, the discontinuity cannot be entirely discriminated in the displayed image. When one sample clock is provided, one pixel is written. In addition, in the third embodiment, the image data comprising one field is stored in two memories. However, the data may be stored in three or more memories, as desired.

In the third embodiment of FIG. 13, the memories are switched at the time the sample clocks in the digital signals are synchronized with the color burst signals, but, not by using horizontal synchronizing signals in analog form, as done in the prior art. Thus, the memory switching time or phase is not shifted because of aging or temperature change. Thus, in the invention, color shading in the displayed image is substantially prevented from occurring.

Fourth Embodiment—Image Processing Circuit

Figure 18:
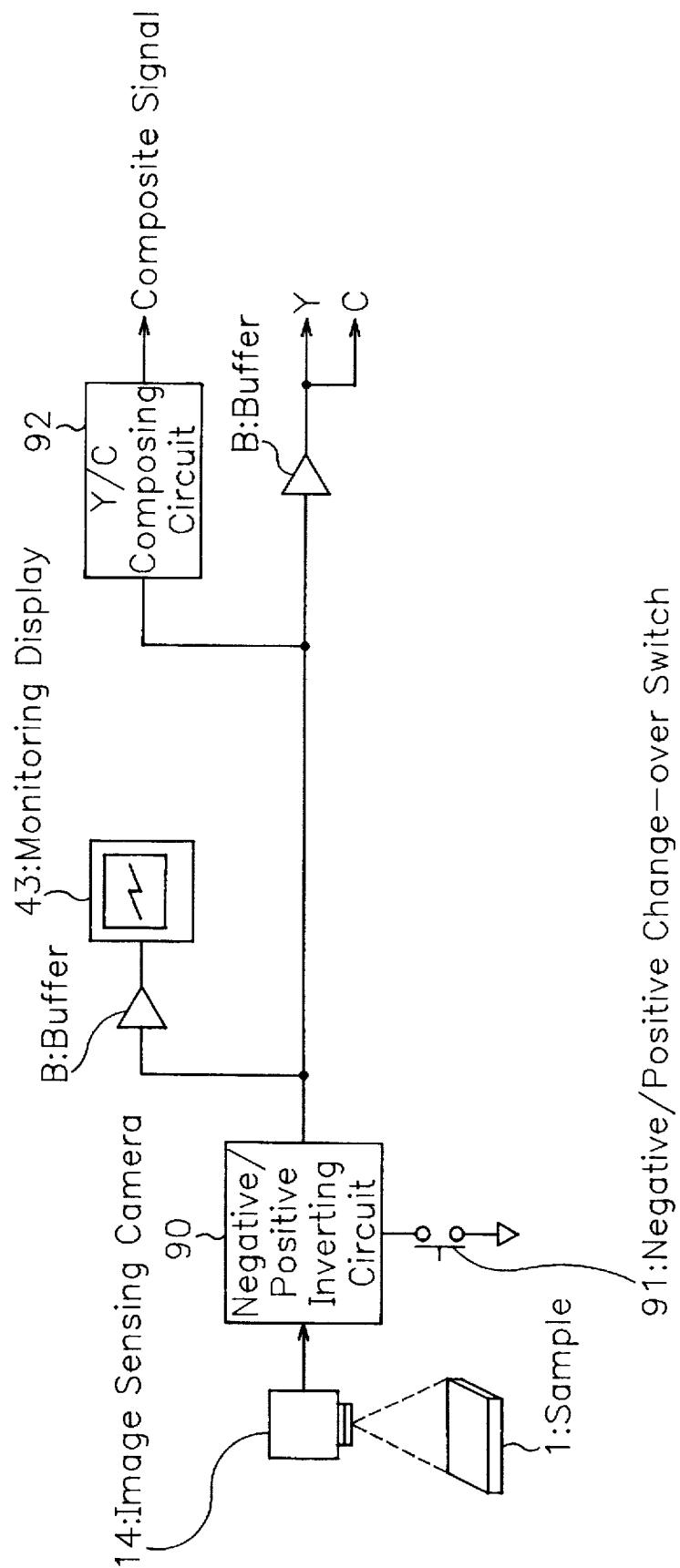
FIG. 18 is a block diagram depicting another image processing circuit used for the invention.

FIG. 18 shows another image processing circuit comprising a negative/positive inverting circuit 90 which changes a negative image, obtained by camera 14, to a positive image and vice versa. A negative/positive change over switch 91 operates the negative/positive inversion circuit. Y/C composing circuit 91 composes a Y signal and a C signal after passing negative/positive inverting circuit 90. The signal produced after composition is a composite signal. A buffer B provides signals Y and C. Thus, the image processing circuit of FIG. 18 generates separate Y and C signals and a Y/C composite signal. Accordingly, the image processing circuit of FIG. 18 can connect a display which receives separate Y and C signals as inputs for images and a display which receives the composite signals as inputs for the images to be displayed.

Figure 19:
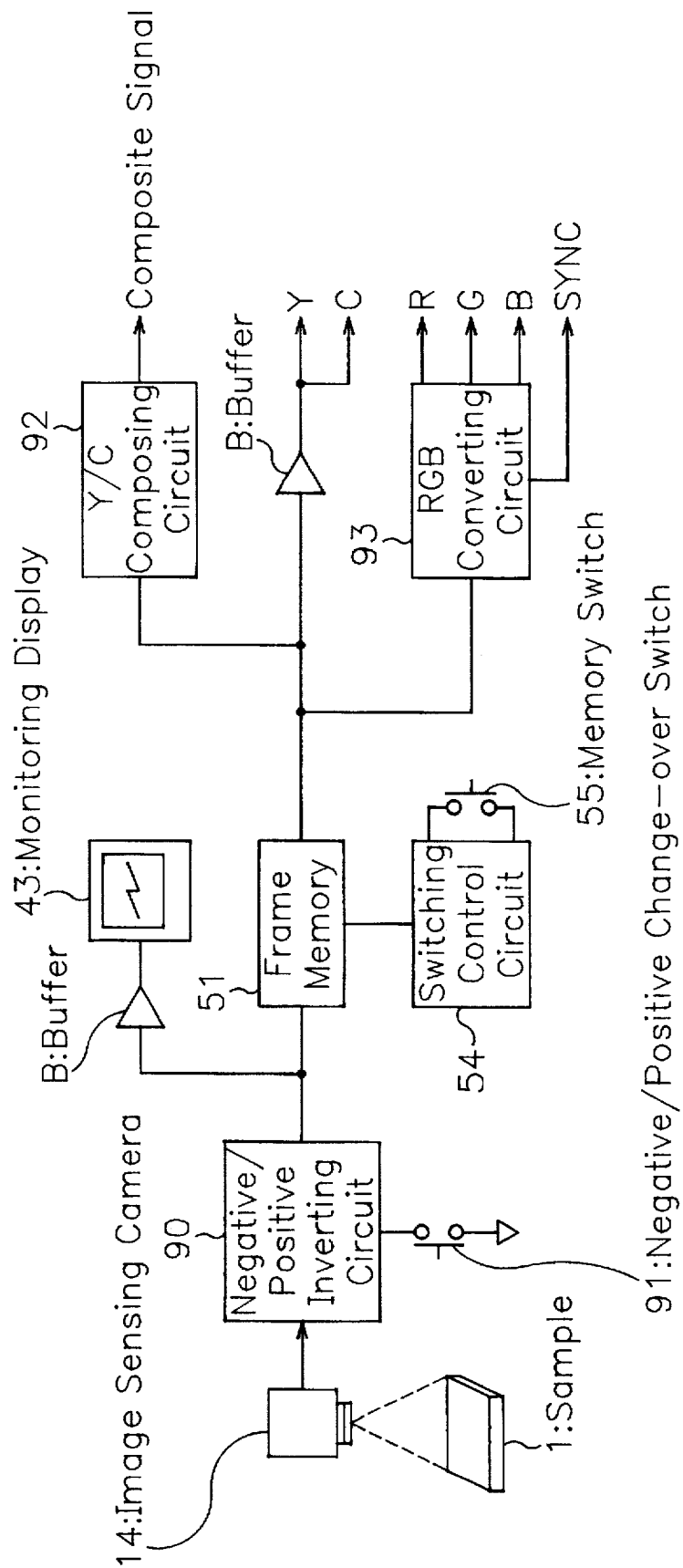
FIG. 19 is a block diagram depicting an example of another image processing circuit used for the invention.

FIG. 19 shows still another image processing circuit comprising frame memory 51 and RGB converting circuit 93. Frame memory 51 enables an image which has been displayed to be retained. RGB converting circuit 93 converts the Y signal and the C signal to R, G, and B signals. The RGB converting circuit 93 enables a display, which receives the R,G and B signals as inputs for the images,. to be connected in addition to a display which is connected to any image processing circuit, such as shown in FIG. 18. A display which receives as inputs the R,G and B signals, for example, is a display which indicates the images by applying the R,G, and B signals to the screen of the display. SYNC shows a synchronous signal.

The foregoing is illustrative of the principles of the invention. Numerous extensions and modifications thereof would be apparent to the worker skilled in the art. All such extensions and modifications are to be considered to be within the spirit and scope of the invention.

What is claimed is:

1. In a visual presentation apparatus comprising:
    a stand on which an object to be displayed is disposed;
    light means for illuminating said object;
    camera means for obtaining an image of said object and for providing a signal representing said image; and
    display means for receiving said signal and for displaying said image of said object represented by said signal; the improvement comprising:
    said stand being formed as a substantially flat surface defined by at least a length dimension;
    said light means having a dimension substantially equal to said length dimension of said stand; and
    an elongated arm attached at one end thereof to and extending upwardly from a side of said stand and rotatably attached toward another end of said elongated arm said camera means and rotatably attached to said elongated arm between said one end thereof and said camera means said light means, whereby an object to be displayed has optimal exposure to light and to access by said camera means.

2. The apparatus of claim 1, further comprising monitor means attached to said extended arm so that an operator can concurrently observe an image of said object on said monitor means and on said display means.

3. In a visual presentation apparatus comprising:
    a stand on which an object to be displayed is disposed;
    light means for illuminating said object;
    camera means for obtaining an image of said object and for providing a signal representing said image; and
    display means for receiving said signal and for displaying said image of said object represented by said signal; the improvement comprising:
    an arm having two ends, one end being attached to said stand and another end being positioned over said stand;
    a camera head comprising said camera means;
    a head support member disposed between said camera head and said other end of said arm;
    first support means for supporting said head support member to be freely rotatable about a vertical axis to said other end of said arm;
    a second support means for supporting said camera head to be freely rotatable about a horizontal axis to said head support member; and
    a third support means for supporting said camera means to be freely rotatable about a light axis to said camera head; wherein
    said camera head enables said camera means to be oriented in any direction through rotatable support of said first and second support means.

4. In a visual presentation apparatus comprising:
    a stand on which an object to be displayed is disposed;
    light means for illuminating said object;
    camera means for obtaining an image of said object and for providing a signal representing said image; and
    display means for receiving said signal and for displaying said image of said object represented by said signal; the improvement comprising:
    said camera means providing color signals containing color burst signals and luminance signals;
    frame memory means comprising at least two memories, said memories having stored therein image data forming a field;
    clock generating means for generating sample clock signals synchronized with said color burst signals contained in color signals from said camera means;
    synchronously separating means for generating field recognition signals from said luminance signals sent from said camera means;
    counter means for starting counting number of said sample clock signals at changing points of said field recognition signals and for outputting a memory switching signal every time the number of counts reaches a predetermined value; and
    control signal generating means for switching said at least two memories to read image data corresponding to said memory switching signals.

5. In a visual presentation apparatus comprising:
    a stand on which an object to be displayed is disposed;
    light means for illuminating said object;
    camera means for obtaining an image of said object and for providing a signal representing said image; and
    display means for receiving said signal and for displaying said image of said object represented by said signal; the improvement comprising:
    said stand being formed as a substantially flat surface defined by at least a length dimension;
    said light means having a dimension substantially equal to said length dimension of said stand; and
    an arm means attached to said stand for holding said camera means and said light means; wherein
    said light means is rotatably mounted on said arm means so that in one position said light means is disposed to be within said arm means.

6. The apparatus of claim 5, further comprising monitor means attached to said arm means so that an operator can concurrently observe an image of said object on said monitor means and on said display means.

* * * * *